United States Patent [19]

Young

[11] Patent Number: 5,653,195

[45] Date of Patent: Aug. 5, 1997

[54] ANIMAL MATTRESS

[75] Inventor: Stuart Douglas Young, Kitchener, Canada

[73] Assignee: Promat Ltd., Canada

[21] Appl. No.: 491,995

[22] PCT Filed: Jan. 17, 1994

[86] PCT No.: PCT/CA94/00019

§ 371 Date: Jul. 18, 1995

§ 102(e) Date: Jul. 18, 1995

[87] PCT Pub. No.: WO94/15452

PCT Pub. Date: Jul. 21, 1994

[30] Foreign Application Priority Data

Jan. 18, 1993 [CA] Canada .................................. 2087464

[51] Int. Cl.⁶ ........................... A01K 1/015; A01K 1/035
[52] U.S. Cl. ..................... 119/526; 119/28.5; 5/948
[58] Field of Search .................... 119/29.5, 526; 5/459, 448, 473, 480, 481; 482/15; 49/9

[56] References Cited

U.S. PATENT DOCUMENTS

| | | | |
|---|---|---|---|
| 1,799,616 | 4/1931 | Kiefer | 5/448 |
| 2,720,861 | 10/1955 | Stroup et al. | 119/526 |
| 3,161,436 | 12/1964 | Hood | 5/481 X |
| 3,369,808 | 2/1968 | Sconce | 482/15 |
| 3,699,926 | 10/1972 | Stockl | 119/526 |
| 3,902,456 | 9/1975 | David | 119/28.5 |
| 4,275,473 | 6/1981 | Poirier | 5/473 X |
| 4,443,009 | 4/1984 | Smith | 482/15 X |
| 4,824,282 | 4/1989 | Waldecker | 49/9 |
| 4,843,666 | 7/1989 | Elesh et al. | 5/480 |
| 4,924,541 | 5/1990 | Inagaki | 5/448 X |
| 4,983,068 | 1/1991 | Kozak et al. | 405/36 |
| 5,002,014 | 3/1991 | Albin | 119/28.5 |
| 5,020,175 | 6/1991 | Kirkpatrick et al. | 5/448 |

FOREIGN PATENT DOCUMENTS

| | | | |
|---|---|---|---|
| OS 25 52 089 | 5/1977 | Germany . | |
| 25 52 089 | 5/1977 | Germany | 119/526 |
| 1277974 | 12/1986 | U.S.S.R. | 482/15 |
| 1036186 | 7/1966 | United Kingdom | 482/15 |

Primary Examiner—Robert P. Swiatek
Assistant Examiner—Elizabeth Shaw
Attorney, Agent, or Firm—Bacon & Thomas

[57] ABSTRACT

In an animal stall, a brisket board extends along the front end portion of the floor, and a keeper board extends along the rear portion of the floor. An animal mattress is disposed on the floor between the brisket board and the keeper board, with the mattress extending over the keeper board. The mattress includes a fabric enclosure having a plurality of separate compartments within the enclosure, and comminuted rubber from used vehicle tires is disposed within each compartment. A top fabric blanket is disposed over the mattress with an end of the blanket attached to the keeper board, and an opposed end of the blanket attached to the brisket board.

10 Claims, 2 Drawing Sheets

ANIMAL MATTRESS

BACKGROUND OF THE INVENTION

1. Field of the Invention

This invention relates to an animal mattress which is particularly intended operatively to be disposed on a concrete or other hard floor within a barn or the like and on which, for example, cows may lie.

2. Background Information

After feeding cows traditionally lie down in the pasture while chewing the cud, and there has hitherto been the problem that during severe winter weather and other periods of inclement weather when the cows are kept in a barn or similar structure the cows are uncomfortable and are not contented when lying down on a concrete or similarly hard floor of the barn. Furthermore, cows nowadays are typically being kept permanently in a barn or similar structure irrespective of the weather conditions. With the view to alleviating this problem various solutions have hitherto been proposed to render the feel of the concrete or similarly hard floor of the barn more akin to that of the pasture. Thus, for example, it has previously been proposed to provide on the floor of the barn a bag of straw on which the cow lies down, but this arrangement has not been fully satisfactory since movement of the cow tends to push the straw within the bag from under the cow. In an alternative proposed solution a layer of comminuted rubber from used vehicle tires has been scattered on the floor of the barn with a loose blanket disposed over this layer of comminuted rubber and with the cow then lying on top of the blanket. While such a layer of comminuted rubber provides from the standpoint of the cow a degree of resiliency and feel which is very similar to that of the pasture this alternative solution again suffers from the disadvantage that movement of the cow results in the comminuted rubber being displaced from under the cow so that the advantages of the cow lying on the layer of comminuted rubber are no longer achieved.

SUMMARY OF THE INVENTION

It is a primary object of the present invention to provide an animal mattress which is operatively disposed on the floor of a barn and which achieves the advantage of the above-mentioned alternative arrangement comprising a layer of comminuted rubber that the cow lying thereon has a level of comfort comparable to that provided by the pasture, while obviating or mitigating the above-described disadvantage of the previously proposed arrangements.

It is to be emphasized that an animal mattress according to the present invention is not restricted in use to cows lying thereon, and the mattress may be used for other cattle and horses to lie thereon. Furthermore, an animal mattress according to the present invention may also advantageously be used on the floor of, for example, a hog breeding area.

In accordance with the present invention there is provided an animal mattress comprising a fabric enclosure having a plurality of separate compartments within the enclosure. Comminuted resiliently deformable rubber material from used automobile tires is disposed loose within each of the compartments.

DESCRIPTION OF THE DRAWINGS

In order that the invention may be more clearly understood and more readily carried into effect the same will now, by way of example, be more fully described with reference to the accompanying drawings in which.

DETAILED DESCRIPTION

Figure 1:
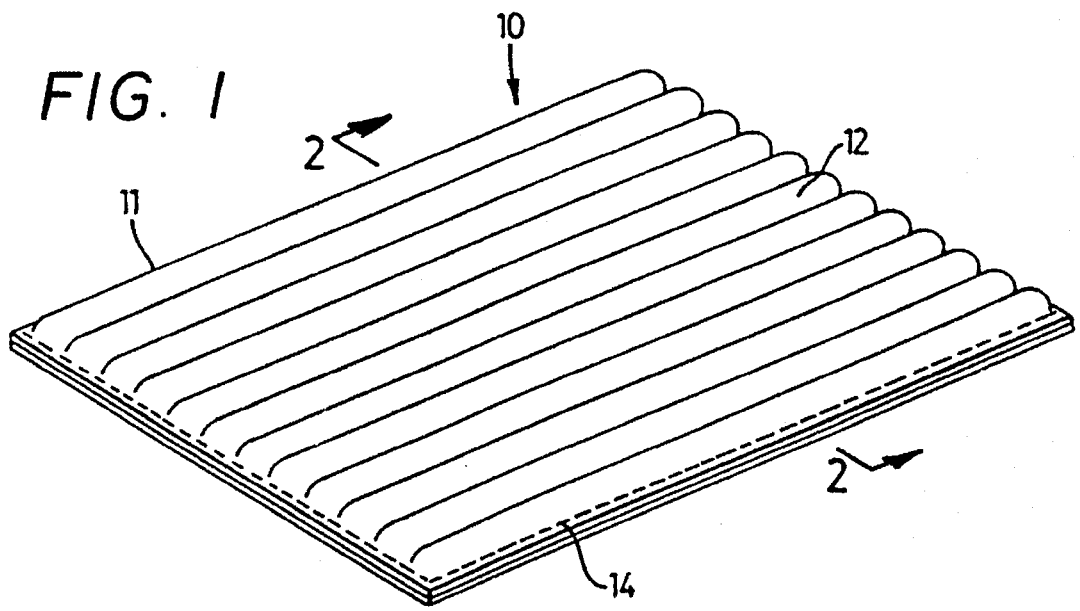
FIG. 1 is an isometric view of an animal mattress according to a preferred embodiment of the invention.
Figure 2:
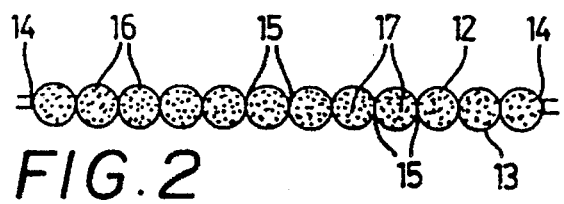
FIG. 2 is a sectioned view on the line 2—2 in FIG. 1.
Figure 5:
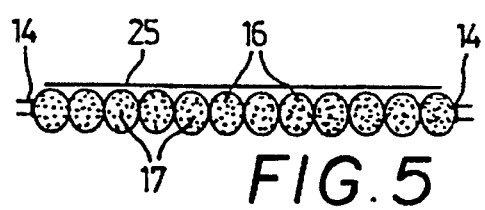
FIG. 5 is a sectioned view on the line 5—5 in FIG. 4.

Referring to the drawings in which like reference numerals denote like parts, 10 denotes generally an animal mattress which comprises a fabric enclosure 11 formed of an upper layer 12 of fabric and a lower layer 13 of fabric, the peripheral edges of the layers 12 and 13 being secured together by, for example, stitching 14. With particular reference to the preferred embodiment shown in FIGS. 1 to 5, inclusive, the layers 12 and 13 are also secured together by longitudinally disposed rows of stitching 15 which form a plurality of separate compartments 16 within the enclosure 11, these compartments 16 being longitudinally disposed in parallel, side-by-side relationship. In the preferred embodiment the length of the mattress 10 is approximately 66 inches, and the width of the mattress 10 is approximately 50 inches, with there being twelve (12) compartments 16 each of which is approximately 4 inches in width.

Disposed loose within each of the compartments 16 is comminuted resiliently deformable material 17, this comminuted material 17 being rubber which, in the preferred embodiment of the invention, is formed by cryogenically breaking-down the rubber in used vehicle tires, the particles of comminuted material 17 preferably being of substantially uniform size and having a maximum dimension of approximately ¼ inch, although comminuted rubber in the form of a powder and constituted by buffings from used vehicle tires may also be used. Using particles of comminuted material 17 of substantially uniform size and having a maximum dimension of approximately ¼ inch or larger has the advantage that in use there are interstices between the particles of comminuted material 17 which, when a cow or other animal lies on the mattress 10, provides the desired degree of resiliency.

In forming the mattress 10 the stitching 14 at one end of the mattress 10 is initially omitted and the comminuted material 17 is preferably disposed by means of an auger into each of the compartments 16 after which this stitching 14 at said one end of the mattress 10 is applied to close the compartments 16. The comminuted material 17 is, of course, prevented from migrating between the compartments 16, so that movement of a cow or other animal on the mattress 10 does not result in the comminuted material 17 being displaced from under the animal.

Figure 3:
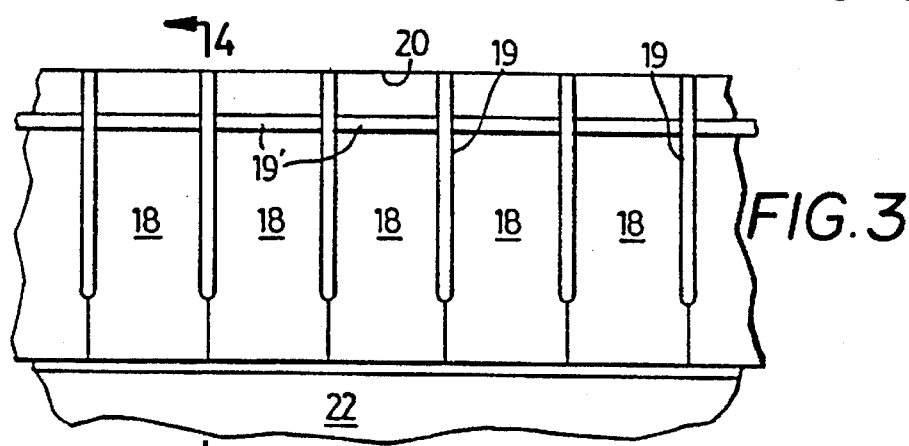
FIG. 3 is a top plan view of animal stalls within a barn, animal mattresses as shown in FIG. 1 being operatively disposed on the floor of the stalls.
Figure 4:
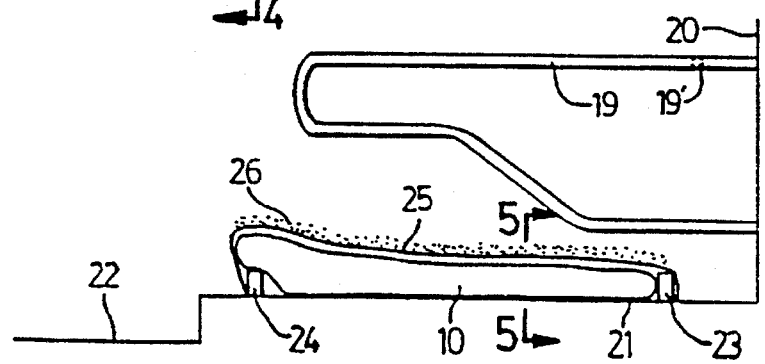
FIG. 4 is a sectioned view on the line 4—4 in FIG. 3.

With particular reference to FIGS. 3 and 4, 18 denotes each of a plurality of animal stalls disposed in side-by-side relationship along the length of a barn or the like, each stall 18 being defined by, for example, an adjacent pair of rails 19 secured to a wall 20, rails 19' interconnecting the rails 19. 21 denotes a floor of concrete or similarly hard material and which may be raised relative to an adjacent hall 22. Along the front end portion of the animal stalls 18 there normally extends a brisket board 23 which may typically be 2 inches wide and 10 inches high, while along the rear end portion of the stalls 18 there normally extends a keeper board 24 which may typically be 2 inches wide and 8 inches high, the purpose of this keeper board 24 being substantially to prevent bedding material on the floor 21 of each stall 18 from being pushed by movement of the animal into the hall 22. However, since it is uncomfortable for the animal to lie on the keeper board 24 the animal tends to move forward in the stall 18 to avoid lying on the keeper board 24, and this is undesirable since it results in the animal urinating and defecating onto the bedding in the stall 18 rather than, as desired, into the hall 22.

This disadvantage is substantially overcome by disposing the mattress 10 within the stall 18 between the brisket board 23 and the keeper board 24 with an end of the mattress 10 extending over the keeper board 24 so that it is no longer uncomfortable for the animal to lie over the keeper board 24, the mattress 10 preferably being retained in position by a top fabric blanket 25 one end of which is attached to the keeper board 24 and the opposed end of which is attached to the brisket board 23. The width of each animal stall 18 is preferably 48 inches so that with mattresses 10 disposed in the stalls 18 each mattress 10 is transversely compressed as shown in FIG. 4. This minimizes the stress on the stitching 15 when an animal is lying on the mattress 10. A layer of sawdust 26 may be provided on the top blanket 25.

The fabric of the layers 12 and 13 is preferably a geotextile felt fabric and is preferably formed of polypropylene or polyester. Likewise, the fabric of the top blanket 25 is preferably a geotextile felt fabric formed preferably of polypropylene or polyester. In the preferred embodiment of the invention the fabric of the layers 12 and 13 is preferably approximately 240 grams per square metre, whereas the fabric of the top blanket 25 is preferably approximately 1600 grams per square meter.

If desired, the fabric of the layers 12 and 13 may be coated with a liquid impermeable substance such as, for example, a latex coating in order to prevent urine and other liquids from soaking into the mattress 10. Alternatively, or in addition, the top blanket 25 may likewise be coated with a liquid impermeable substance.

Particularly if the layers 12 and 13 and the top blanket 25 are not so coated with a liquid impermeable substance so that urine and other liquids may drain through the mattress 10 the fabric of the layers 12 and 13 may be impregnated with a bactericide such as an iodine bactericide. Alternatively, or in addition, the top blanket 25 may, of course, be impregnated with a bactericide.

The stitching 14 and 15 is preferably of polypropylene or nylon.

Figure 6:
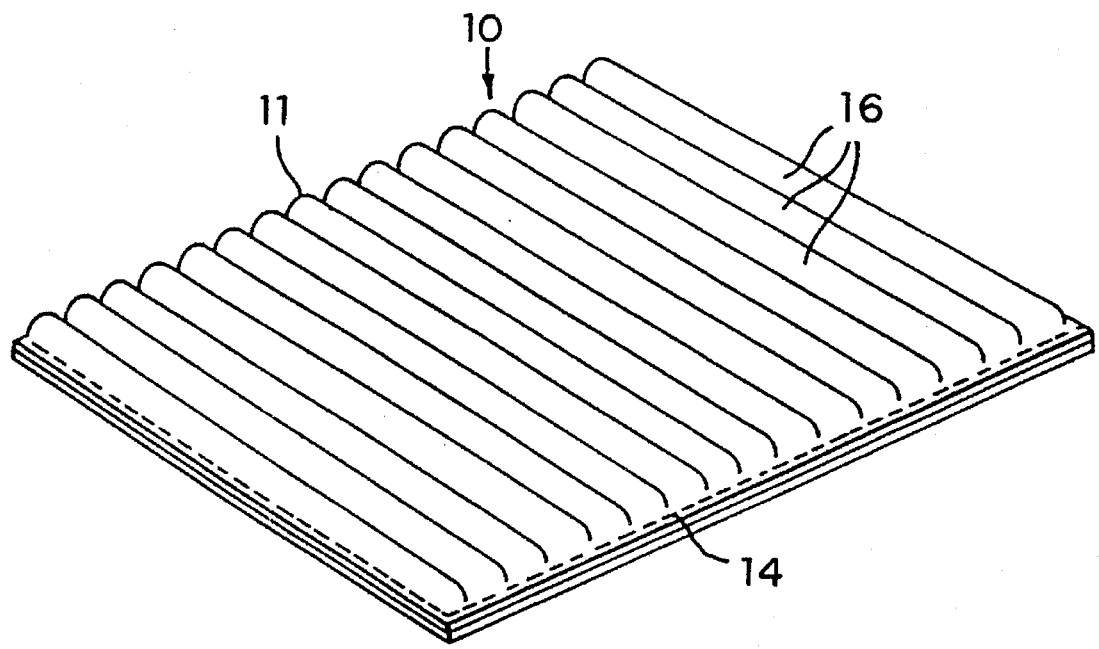
FIG. 6 is an isometric view corresponding to FIG. 1 of an animal mattress according to an alternative embodiment of the invention.
Figure 7:
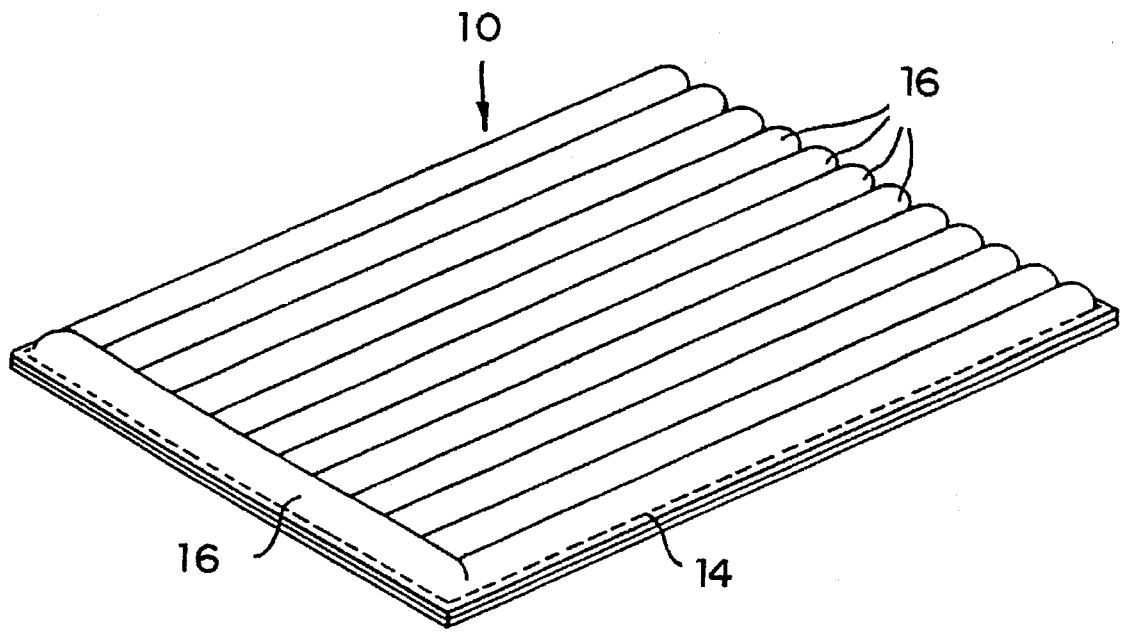
FIG. 7 is an isometric view corresponding to FIG. 1 of an animal mattress according to a further alternative embodiment of the invention.

The mattress 10 according to the alternative embodiment of the invention shown in FIG. 6 differs from the mattress 10 hereinbefore described with reference to FIG. 1 only in that the stitching 15 is disposed in transverse instead of longitudinal rows so that the compartments 16 are transversely disposed in parallel, side-by-side relationship. The mattress 10 accordingly to the further alternative embodiment of the invention shown in FIG. 7 differs from the mattress 10 hereinbefore described with reference to FIG. 1 in that in addition to the longitudinally disposed compartments 16 there is at one end of the mattress 10 a transversely disposed compartment 16. In this further alternative embodiment there may, of course, be provided more than one transversely disposed compartment 16.

I claim:

1. An animal mattress comprising a fabric enclosure having a plurality of separate compartments within the enclosure, and comminuted resiliently deformable rubber from used vehicle tires disposed loose within each compartment.

2. An animal mattress according to claim 1, wherein the compartments are longitudinally disposed in parallel, side-by-side relationship.

3. An animal mattress according to claim 2, wherein there are twelve compartments each having a width of approximately 4 inches.

4. An animal mattress according to claim 1, wherein the compartments are transversely disposed in parallel, side-by-side relationship.

5. An animal mattress according to claim 1, wherein at least one of the compartments is transversely disposed, and there is a plurality of remaining compartments which are longitudinally disposed in parallel, side-by-side relationship.

6. An animal mattress according to claim 1, wherein the enclosure is of geotextile felt fabric.

7. An animal mattress according to claim 6, wherein the enclosure is of a polypropylene fabric.

8. An animal mattress according to claim 7, wherein the fabric enclosure has a liquid impermeable coating.

9. An animal mattress according to claim 1, wherein the comminuted rubber has a substantially uniform particle size of approximately ¼ inch maximum dimension.

10. In an animal stall having a floor with a front end portion and a rear end portion, a brisket board extending along the front end portion of the floor, and a keeper board extending along the rear end portion of the floor, an animal mattress is disposed on the floor between the brisket board and the keeper board, the mattress which extends over the keeper board comprising a fabric enclosure having a plurality of separate compartments within the enclosure, and comminuted resiliently deformable rubber from used vehicle tires disposed loose within each compartment, and a top fabric blanket is disposed over the mattress with an end of the blanket attached to the keeper board, and an opposed end of the blanket attached to the brisket board.

* * * * *